United States Patent [19]

Tavernetti

[11] Patent Number: 4,868,668
[45] Date of Patent: Sep. 19, 1989

[54] SYSTEM AND METHOD FOR IMAGE ADJUSTMENT IN AN OPTICAL PROJECTION SYSTEM

[75] Inventor: Russell E. Tavernetti, San Carlos, Calif.

[73] Assignee: Electrohome Limited, Kitchener, Canada

[21] Appl. No.: 120,307

[22] Filed: Nov. 13, 1987

Related U.S. Application Data

[63] Continuation-in-part of Ser. No. 898,617, Aug. 21, 1986, which is a continuation-in-part of Ser. No. 899,002, Aug. 22, 1986, abandoned.

[51] Int. Cl.$^4$ .............................................. H04N 5/74
[52] U.S. Cl. ................................... 358/237; 358/231; 358/10; 358/60
[58] Field of Search ............... 358/231, 237, 242, 139, 358/10, 60, 61

[56] References Cited

U.S. PATENT DOCUMENTS

| | | | |
|---|---|---|---|
| 3,571,453 | 3/1971 | Baker | 358/60 |
| 3,657,550 | 4/1972 | Brown et al. | 358/139 X |
| 3,894,182 | 7/1975 | Yamamoto et al. | 358/231 |
| 3,962,722 | 6/1976 | Ciciora | 358/10 |
| 4,001,877 | 1/1977 | Simpson | 358/10 |
| 4,085,425 | 4/1978 | Hamill | 358/237 |
| 4,159,484 | 6/1979 | Strathman | 358/10 X |
| 4,586,053 | 4/1986 | Hughes | 358/237 |
| 4,593,308 | 6/1986 | Kemplin | 358/10 |
| 4,607,288 | 8/1986 | Freyberger | 358/242 |

FOREIGN PATENT DOCUMENTS

| | | | |
|---|---|---|---|
| 58-51676 | 3/1983 | Japan | 358/163 |
| 59-178089 | 10/1984 | Japan | 358/60 |

Primary Examiner—James J. Groody
Assistant Examiner—E. Anne Faris
Attorney, Agent, or Firm—Majestic, Parsons, Siebert & Hsue

[57] ABSTRACT

A system and method are provided for controlling a characteristic of an optical image generated by a video projection system of the type wherein illumination light is passed through a polarizing means and then directed to a light modulation device which receives a light image and provides an polarization modulated optical image as outgoing light, the outgoing light being passed through a projection lens to display the optical image. According to the present invention, a portion of the outgoing light is sampled and the sampled portion is directed to a detector which detects characteristics of the outgoing light. The detected characteristics are then compared with the corresponding desired characteristics exhibited by a test pattern image. The differences between the detected characteristics and the desired characteristics are measured and the measured differences are utilized to generate correction factors for controlling the outgoing light such that the outgoing light exhibits the desired characteristics.

10 Claims, 2 Drawing Sheets

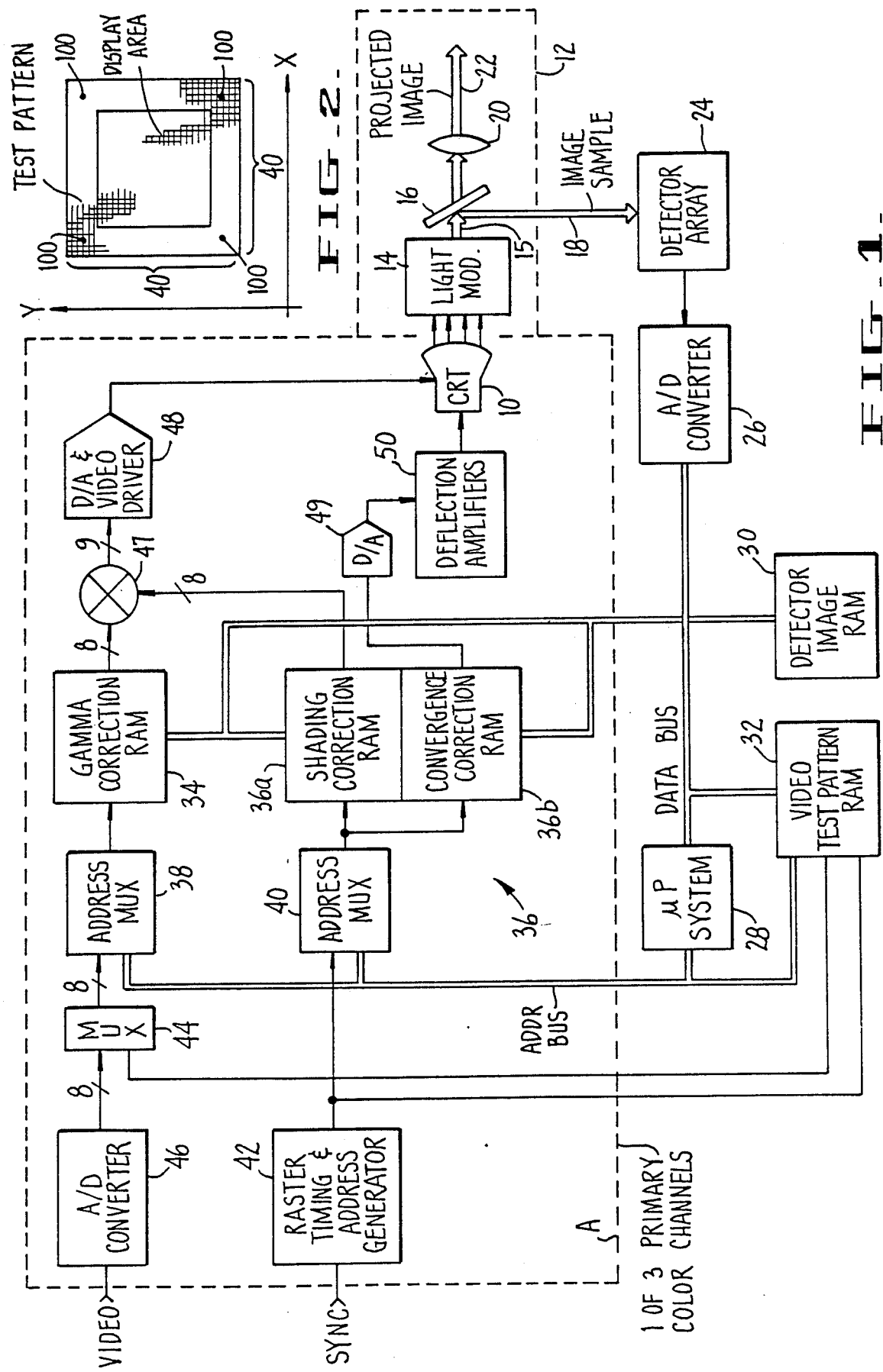

SYSTEM AND METHOD FOR IMAGE ADJUSTMENT IN AN OPTICAL PROJECTION SYSTEM

This application is a continuation-in-part of copending applications Ser. No. 06/898,617 filed Aug. 21, 1986, now abandoned, and Ser. No. 06/899,002, assigned an Aug. 22, 1986 filing date now abandoned.

BACKGROUND OF THE INVENTION

1. Field of the Invention

The present invention relates to optical projection systems and, in particular, to a system and method for automatically controlling image registration, brightness and gamma correction in a full-color light valve projection system.

2. Discussion of the Prior Art

In a typical full-color projection system, illumination light from a xenon arc lamp is directed toward a liquid crystal light valve system through a polarizer/reflector optical system. The illumination light first passes through a first beam-splitting polarizing prism that pre-polarizes the light. S-polarized light is rejected from the system at this point and p-polarized light is transmitted. A second identical beam-splitting polarizing prism, oriented at 90° with respect to the first prism, "sees" the light incident from the first prism as s-polarized and, therefore, reflects it toward the liquid crystal light valves. The s-polarized light from the second prism is first directed through a blue reflecting dichroic filter. Green and red wavelengths are transmitted by this filter and next encounter a red reflecting dichroic filter. This second filter reflects the red light and transmits the green. The green light is then transmitted directly to a "green" liquid crystal light valve. The incoming red and blue light beams are each reflected to their respective liquid crystal light valves. Thus, the s-polarized illumination light leaving the second prism is split into three individual primary color illumination beams, each of which enters a separate reflective liquid crystal light valve. The light from an image on an individual CRT associated with each color channel is directed to the photoconductive region of its associated light valve. Thus, on reflection by a liquid crystal light valve, the outgoing light contains a polarized, intensity-modulated, single-color, optical image that is a replica of the image on the CRTs. The outgoing light from each liquid crystal light valve then retraces its way back through the color filter assembly. The red and green modulated beams are recombined at the red reflecting filter and these are then recombined with the blue modulated beam at the blue reflecting filter. The recombined light from the three color channels now shares the same common optical axis as it did before intensity modulation. This recombined light passes back through the second polarizing prism which transmits p-polarized light and reflects s-polarized light back toward the arc lamp illumination light source. The light transmitted by the second prism now consists of intensity modulated light containing the full-color light image from the CRTs. This primary projection image is passed through a wide angle projection lens which directs it toward a screen for display.

A color projection display system of the type just described is disclosed by Ledebuhr "Full-Color Single-Projection-Lens Liquid-Crystal Light-Valve Projector", SID 86 Digest, p. 381.

For a system such as that described by Ledebuhr to provide a high quality, high resolution display image, it is necessary to monitor the displayed image, detect characteristics of that image and adjust the projection system accordingly to obtain the desired quality display.

For example, to maintain accurate registration of the three primary color projected images over the entire display screen area, the CRTs of system such as that described by Ledebuhr contain focus and astigmatism coils for spot shape programming, as well as additional deflection coils which are used to dynamically shape the three images. While this produces an initial registered image on the display area, thermal and electrical drifts can cause image misregistration.

In order to reduce the drift to zero, the system described by Ledebuhr includes a feedback loop which is used to maintain the registration of the primary color images. Three position-sensitive photodetectors are mounted at the display screen, outside the display area, to monitor the position of three projected target patterns that are generated during the vertical blanking interval of the display. Position signals from these three sensors are used to provide correction signals to the CRT deflection coils, which independently position the location of each color image.

It is also necessary to correct for gamma distortions within the projection system. Gamma is the characteristic that mathematically describes the relationship between the cathode current density and the amount of light produced by a given CRT. A linear intensity increment from the CRT signal generator will produce a non-linear change in visible brightness in the projected display image. In the past, non-linear analog amplifiers have been provided in the CRT video circuitry to correct for gamma distortions. According to another approach, the signal voltage for each color component for a given pixel value is set via digital values stored in a color look-up table. That signal is then converted to a cathode drive current for the CRT.

It is also necessary to correct the projected display image for brightness non-uniformities in the display output. In the past, this has been accomplished by summing the horizontal and vertical rate waveforms into a video signal to correct for brightness variations.

SUMMARY OF THE INVENTION

It is an object of the present invention to provide a portable, full-color light valve projection system which includes an internal system for controlling the quality of the projected image.

It is a further object of the present invention to provide a full-color light valve projection system which provides for automatic compensation for grey-scale non-linearities and brightness non-uniformities in the projected display image.

It is a further object of the present invention to provide a full-color light valve projection system which includes an internal system for automatic registration correction for the three projected primary color images.

These and other objects of the invention are accomplished by providing a system and method for automatically controlling the characteristics of a displayed optical image utilizing an internally-generated sample image in conjunction with novel control circuitry. Illumination light passes through first and second beam-splitting polarizing prisms. Light from the prism combination is directed to a light modulation system which receives a light image and provides an intensity-modulated optical image as outgoing light. The outgoing light is passed through a projection lens which focuses the image for display. According to the present invention, a portion of the outgoing light is sampled prior to the projection lens and the sampled portion is directed to a CCD array which detects characteristics of the outgoing light. The detected characteristics are then compared with the characteristics of a corresponding test pattern image. The differences between the detected characteristics and the characteristics of the test pattern image are measured and these measured differences are utilized to generate correction factors for controlling the outgoing light.

DESCRIPTION OF THE DRAWINGS

FIG. 1 is schematic block diagram illustrating a system for automatically controlling image registration, brightness and gamma correction in a full-color light valve projection system according to the present invention.

FIG. 2 is a schematic diagram illustrating a registration test pattern utilized in conjunction with the present invention.

DETAILED DESCRIPTION OF A PREFERRED EMBODIMENT

Figure 3:
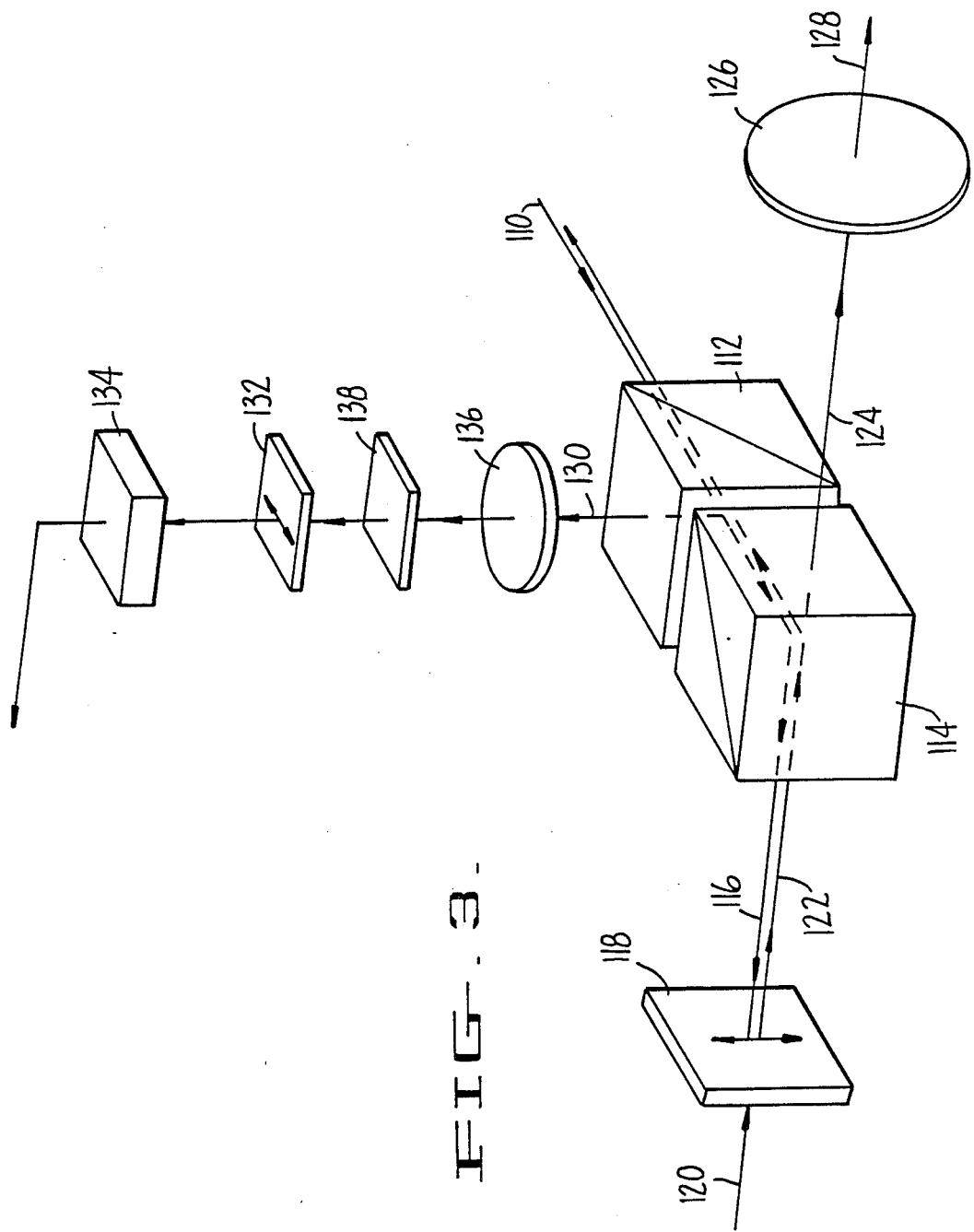
FIG. 3 is a schematic diagram illustrating a preferred technique for image sampling in accordance with the present invention.

FIG. 1 schematically illustrates a typical full-color light valve projection system. The dotted line A in FIG. 1 encloses one of three identical primary color channels, each of which relies on a CRT 10 to generate a primary color light image which is provided to an optical display and image sampling system 12.

The optical display and image sampling system 12 shown in FIG. 1 includes a light modulation system 14 which receives the individual light images from the three RGB CRTs and combines them to provide an intensity modulated output light beam 15 which contains a full-color image. The output light beam 15 is provided to an optical sampling system 16 which operates on the output light beam to provide an image sample 18 which is directed toward a detector array 24. Another portion of the output light beam is directed through a projection lens 20 to provide a primary projected image 22 for display.

A preferred optical display and image sampling system 12 for generating image sample 18 and primary projected image 22 is illustrated in FIG. 3.

Referring to FIG. 3, in a typical light valve projection system, illumination light 110 is passed through a beam-splitting prepolarizing prism 112 which reflects a first light beam of a first polarization state and transmits a second light beam of a second polarization state. The first beam is discarded; the second beam is directed to a second beam-splitting polarizing prism 114 which is oriented at 90° with respect to the first prism 112. Because of its orientation, the second prism 114 sees the incoming light from the first prism 112 as being of the first polarization state and, thus, reflects it, as beam 116 in FIG. 3 toward modulation device 118. Modulation device 118 also receives a light image 120 and provides a polarization modulated optical image as outgoing light 122. The outgoing light 122 from modulation device 118 is passed back through the second prism 114. A resulting primary projected image 124 is passed through projection lens 126 which focuses the primary projected image 124 for display. Thus, the projected image 128 shown in FIG. 3 corresponds to projected image 22 shown in FIG. 1.

As further shown in FIG. 3, an optical system is provided for sampling the outgoing light 122 before it passes through the projection lens 126. The sample image 130 is directed to a detector 132 which detects one or more characteristics of the image. The detected characteristics are then utilized by a controller 134 to control the primary projected image 124 being passed through the projection lens 126.

For example, as described in conjunction with the present invention, the detector 132 may detect image brightness in different areas of the sample image 130. Since the sample image is a replica of the primary projected image 124, these detected brightness characteristics can be used to control the brightness of the projected image 124.

In full-color projection systems, the detector 132 may detect the registration characteristics of a sample image for each projected individual color; these characteristics may then be used to insure accurate registration of the individual color images in the projected display.

The optical system shown in FIG. 3 serves two purposes. The first purpose is to prepolarize illumination light 110 and reduce its cone angle for passage through the second beam-splitting polarizing prism 114. The result is a clearer, more distinct image than if a single beam-splitting polarizer is used. The second purpose is to use normally wasted light to generate the secondary sample image 130. This secondary sample image 130 corresponds to image sample 18 in FIG. 1 and is used to control the primary projected image.

The optical system shown in FIG. 3 relies on utilizing a particular beam of light that is reflected by the two polarizing, beam-splitting prisms 112 and 114. This light beam is routinely found in all light valve projection systems of this type, but is normally discarded. This "waste" light contains an exact replica of the primary projected image 124 and that, if this replica is used, a secondary sampling image 130 is created without inserting any additional elements into the primary projected beam 24.

In the system shown in FIG. 3, the illumination light 110, which becomes polarized after passing through the first polarizing prism 112, is reflected onto the modulation device 118 by the second polarizing prism 14. At this point, the light 116 is s-polarized with respect to the second polarizing prism 114. After being modulated by the modulation device 118, the outgoing light 122 is reflected back onto itself by a high reflectance mirror that makes up one layer of the modulation device 118.

A portion of the outgoing light 122 reflected from modulation device 118 is p-polarized with respect to the second polarizing prism 114. This portion of outgoing light 122 is the "positive" image. Most of this light will pass through the second prism 114 and through the projection lens 126 as the primary projected image 124. However, because of inherent limitations of the second polarizing prism 114, part of the positive image is reflected by prism 114 instead of being transmitted. This reflected portion, approximately 2-3% of the p-polarized portion of outgoing light 122, is s-polarized with respect to the first prism 112 and, thus, is reflected upwardly toward detector 132 as part of sample image 130.

The remaining portion of outgoing light 122 reflected from modulation device 118 is s-polarized with respect to the second polarizing prism 114. This portion of outgoing light 122 is the "negative" image and is reflected by prism 114. Because it appears to be p-polarized with respect to the first prism 112, most of this light passes back through the first prism 112 toward the source of illumination light 110. However, because of inherent limitations of the first prism 112, part of the negative image, approximately 2–3% of the s-polarized portion of outgoing light 122, which is now p-polarized with respect to the first prism 112, is reflected upwardly toward detector 132 as part of sample image 130 instead of being transmitted.

A lens 136 is provided to produce a reduced size sample image at the detector 132. A polarizer 138 is inserted between lens 136 and detector 132. The purpose of polarizer 138 is to discriminate between the positive and negative images which, as described above, are both present in the sample image 130. Without polarizer 138, the positive and negative images combine in such a way that the contrast ratio of the resulting sample image 130 would be nearly zero. However, with all of the elements present as shown in FIG. 3, a high contrast replica of the primary projected image 124 can be produced. It is then a relatively easy matter to select an imaging lens 36 that produces the correct magnification ratio to match the size of detector 132.

Referring again to FIG. 1, the image sample 18 (which corresponds to sample image 130 in FIG. 3) is provided to the image control system of the present invention. The image sample 18 is first directed to a CCD detector array 24 which is linear over the range of light levels of the output light beam from the light modulation system. The NXM CCD array 24 provides a geometric reference for the projected display image 22. The analog output of detector array 24 is provided as an input to a conventional 8-bit video flash A/D converter 26 which in conjunction with detector image RAM 30, takes a "snapshot" of the input. That is, the 8-bit output signal from A/D converter 26, which includes information relating to the intensity and registration of the primary projected image 22 with respect to the CCD reference, is provided to a data bus associated with microprocessor system 28 whereby it is mapped 1:1 into NXM detector image RAM 30. Detector image RAM 30 is actually an 8 plane deep RAM stack, each of the stacked RAMs being NXM, corresponding to the NXM configuration of the CCD detector array 24. Also connected to the data bus are a video test pattern RAM 32, a gamma correction RAM 34 and a combined RAM 36 comprising shading correction RAM 36a and convergence correction RAM 36b. An output of microprocessor system 28 is connected to address multiplexers 38 and 40 which provide address information to gamma correction RAM 34 and combined convergence correction/shading correction RAM 36, respectively. A video test pattern RAM 32 receives output address information from raster timing and address generator 42 and provides video test pattern output data to multiplexer 44. A second input to multiplexer 44 is provided by A/D converter 46 which receives a video input signal. Raster timing and address generator 42 receives a synchronization input and provides a second input to address multiplexer 40. Output data from gamma correction RAM 34 and shading correction RAM 36a is provided via multiplier 47 to D/A converter and video driver 48 which provides control signals to its associated CRT 10. Output data from convergence correction RAM 36b is provided to deflection amplifiers 50 which control the associated CRT 10 to provide accurate registration of the output image.

To insure accurate registration of three primary color images generated by the respective CRTs, at initial power up of the projection system an input selector associated with microprocessor system 28 selects one color video source while the other two colors are shut down. Processor system 28 then locates a desired registration test pattern for that color in video test pattern RAM 32 and displays it. The displayed test pattern is sampled as described above and the correction values are loaded into convergence correction RAM 36b. The same procedure is then repeated sequentially for each of the other two colors.

As shown in FIG. 2, in the preferred embodiment, the test pattern for image registration establishes the location of 1600 test pattern zones comprising a 40 x 40 grid. The test pattern includes a dot 100 of a desired color which is displayed just outside the four corners of the display area. During the initialization process for the projection system, microprocessor system 28 aligns the projected image for each of the three CRTs to correspond to a prescribed geometry referenced to CCD array 24 so that corresponding dots for each color are detected at the same location on detector array 24, the result being that there is initial accurate registration of the three color images. Thus, the geometry of each image is corrected to correspond to the detector array, rather than to one of the images, as is the case in prior art registration systems. This dot position information detected by array 24 is loaded into detector image RAM 30.

During subsequent normal operation of the projection system, each separate color image is periodically monitored by providing a sample image 18 for that color to the detector array 24. The corner dot positions for that sample image are loaded into detector image RAM 30. Processor system 28 then compares the sample image information from detector image RAM 30 with the initial test pattern position information for that color which is stored in video test pattern RAM 32. Any differences between the actual position of the corner dots as detected by array 24 and the desired dot positions as reflected by the test pattern information is resolved by the microprocessor system 28 by updating convergence correction RAM 36b with new values. The correction output from convergence correction RAM 36b is provided via D/A converter 49 to deflection amplifiers 50 to correct CRT 10 to provide accurate registration for that color.

For automatic brightness and gamma correction, two periodically-implemented, independent processes occur simultaneously. First, incoming video is digitized into eight bit values and then remapped to other eight bit values by a look up table contained in the gamma correction RAM 34. Second, an eight bit value, corresponding to each unique picture element, modulates the gain of the video stream at the proper time, to correct for any brightness variations in the display.

This is accomplished by filling both the shading correction RAM 36a and the gamma correction RAM 34 with one half full scale values. Then the output of the CRT for that particular color is sampled and the image sample is provided to detector array 24. The characteristics of the sample image determined by the detector array 24 are loaded into detector image RAM 30 and compared with an appropriate video test pattern image from video test pattern RAM 32. Any brightness variations are measured by microprocessor system 28 and correction factors are generated and loaded into the shading correction RAM 36a. At the end of this step, the projected image will consist of a flat field with no discernible brightness variations.

Next, gamma correction RAM 34 is filled with full scale values and the resultant display image brightness is measured. This is done to determine the minimum and maximum display brightness.

When the minimum and maximum points are known, then gamma correction RAM 34 is loaded with values which provide equal 1/255 increments between the minimum and maximum points. Once gamma correction RAM 34 is full, then the entire process is repeated for each color channel. When this process is completed for each channel, the projected display image has linear grey-scale accuracy, color balance, and uniform brightness over the entire display area.

It should be understood that various alternatives to the system described herein may be employed in practicing the present invention. It is intended that the following claims define the invention and that the structure within the scope of these claims and their equivalents be covered thereby.

What is claimed is:

1. A method of controlling a characteristic of an optical image generated by a video projection system of the type wherein illumination light is passed through a polarizing means and then directed to a light modulation device which receives a light image and provides a polarization modulated optical image of outgoing light, the outgoing light being passed through a projection lens to display the optical image, the method comprising:
    sampling a portion of the outgoing light;
    directing the sampled portion to a detector which detects the characteristic of the optical image in the outgoing light;
    comparing the detected characteristic with a corresponding characteristic of a test pattern image;
    measuring differences between the detected characteristic and the characteristic of the test pattern image; and
    utilizing the measured differences to control the characteristic of the outgoing light.

2. A method as in claim 1 wherein the characteristic of the outgoing light is controlled to correspond to a prescribed geometry referenced to the detector.

3. A method as in claim 2 wherein the detector is a CCD array.

4. A method as in claim 2 wherein the characteristic is image registration.

5. A method as in claim 2 wherein the characteristic is image brightness.

6. A system for controlling a characteristic of an optical image generated by a video projection system of the type wherein illumination light is passed through a polarizing means and then directed to a light modulation device which receives a light image and provides a polarization modulated optical image as outgoing light, the outgoing light being passed through a projection lens to display the optical image, the system comprising:
    image sampling means for providing a portion of the outgoing light as an image sample;
    a detector which receives the image sample and detects a characteristic of the outgoing light;
    first storage means for storing information relating to the detected characteristic;
    test pattern storage means for storing information relating to a desired characteristic of the outgoing light;
    processor means for measuring differences between the detected characteristic and the desired characteristic and for generating correction factors which are used to control the outgoing light such that the outgoing light exhibits the desired characteristic.

7. A system as in claim 6 wherein the characteristic of the outgoing light is controlled to correspond to a prescribed geometry referenced to the detector.

8. A system as in claim 7 wherein the detector is a CCD array.

9. A system as in claim 7 wherein the characteristic is image registration.

10. A system as in claim 7 wherein the characteristic is image brightness.

* * * * *